April 20, 1965 T. W. ROLPH 3,179,796
LIGHT REFRACTING PLATES
Filed July 29, 1957 4 Sheets-Sheet 2

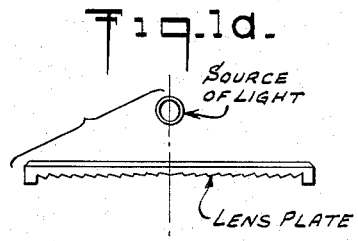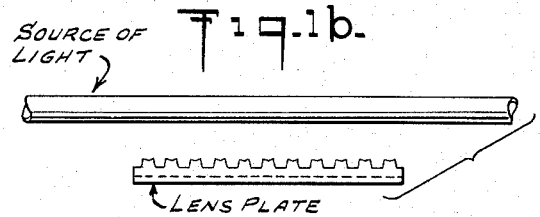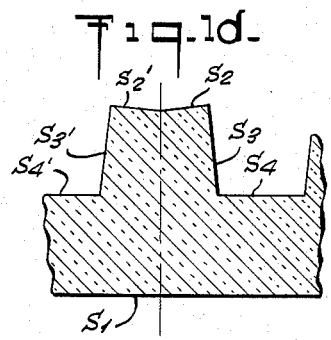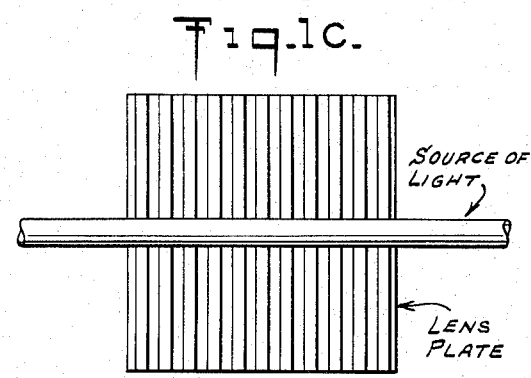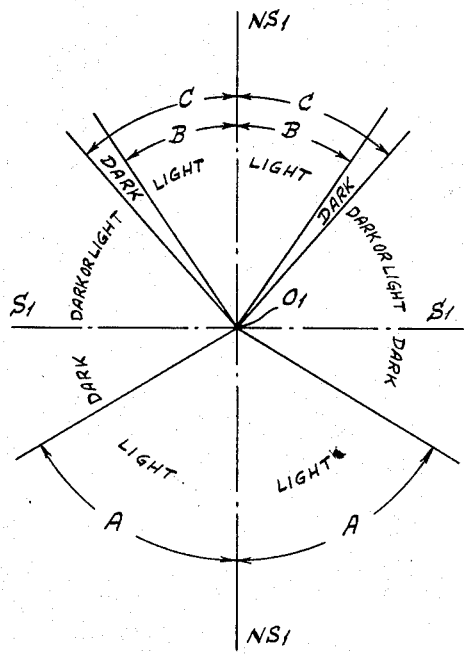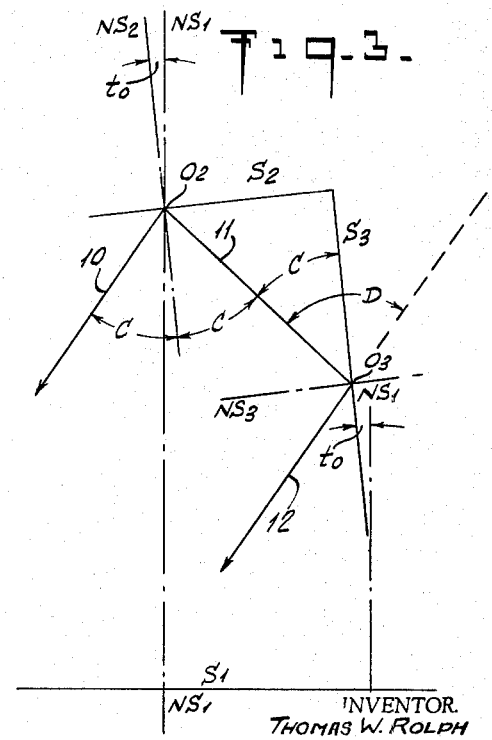

INVENTOR.
THOMAS W. ROLPH
BY
Nolte & Nolte
ATTORNEYS

INVENTOR.
THOMAS W. ROLPH
BY
Nolte & Nolte
ATTORNEYS

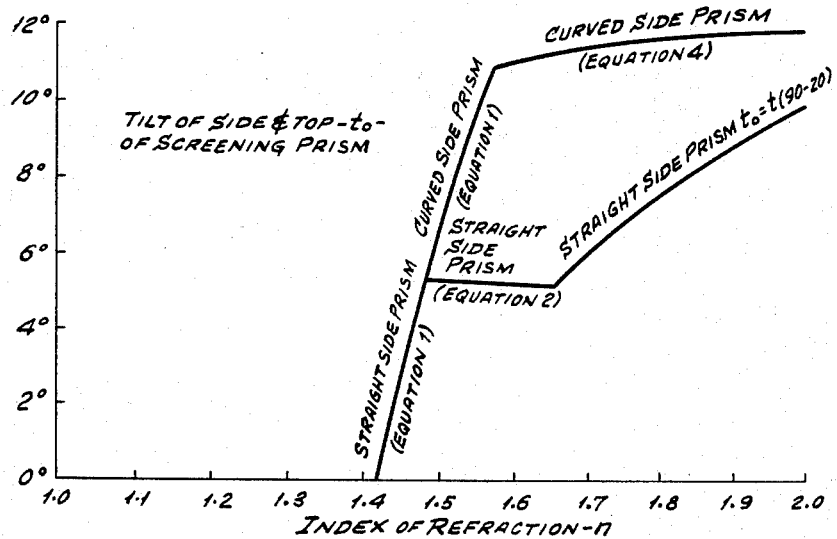
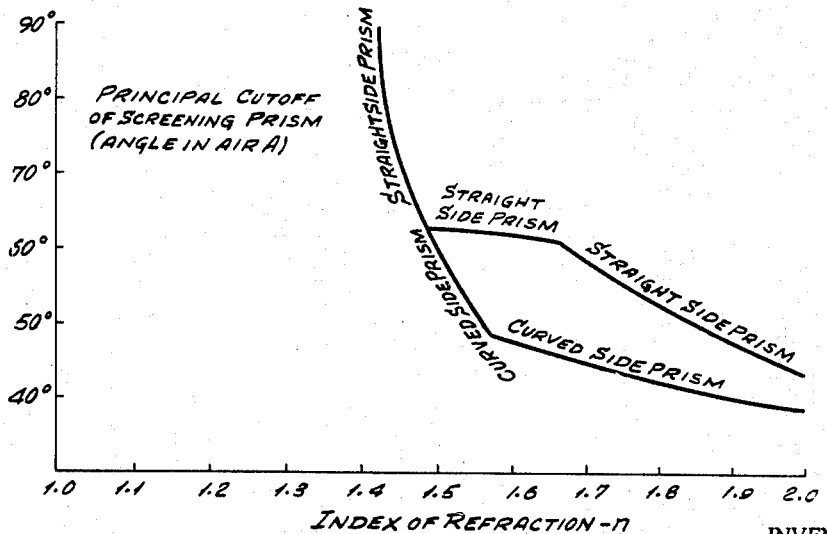

United States Patent Office 3,179,796
Patented Apr. 20, 1965

3,179,796
LIGHT REFRACTING PLATES
Thomas W. Rolph, Chula Vista, Calif., assignor to Holophane Company, Inc., New York, N.Y., a corporation of Delaware
Filed July 29, 1957, Ser. No. 674,837
4 Claims. (Cl. 240—106)

The present invention relates to refracting and transmitting plates and lighting equipment using the same and is more particularly directed to such plates and lighting equipment wherein a control of the direction of emitted right rays is obtained such as to shield certain regions lengthwise of the equipment and reduce emission of light into such regions without the use of opaque media.

Direct lighting equipment for long light sources, for example fluorescent lamps, commonly employs trough-like reflectors to shield the source laterally and to control the direction of reflected light without, however, in any way controlling the longitudinally emitted light.

To effect control in transverse planes of the reflected and direct light, or the shielding of the sources, various means are employed including diffusing plates; longitudinal, more or less opaque shields, and prismatic plates. The latter provide the most complete control.

Longitudinal control can be obtained by louvers. Light can be intercepted by transverse shields of metal or translucent plastic. It is common to do this, especially when screens are employed in egg crate pattern.

Where prismatic plates are employed to secure control of light in transverse directions, longitudinal prisms are placed on either the upper surface or the lower surface or on both surfaces. The location of such prisms depends upon the control desired. More frequently the conditions of control are such as to require that the prisms be located on the lower surface of the plate. If such lens plates are to provide longitudinal control of light in addition to the usual transverse control, the configurations to provide such longitudinal control should be located on the upper surface of the plate.

The present invention, therefore, contemplates providing the upper or light incident surface of the plate with suitable configuration to control the light in longitudinal planes. Inasmuch as the plate is made of a transparent medium, both refraction of rays on entering and leaving, and internal reflection of rays are involved in the solution of the problem.

The accompanying drawings show the present invention, it being understood that the drawings are illustrative of the invention rather than limiting the same.

In these drawings:

FIGURES 1a, 1b, 1c, and 1d picture a lens plate which provides both lateral and longitudinal control.

FIGURE 2 is a diagram to represent light control at the emergent surface of a refracting medium.

FIGURE 3 is a diagram to illustrate light control at two surfaces one of which acts as a refractor and the other as a reflector of some of the refracted light.

FIGURE 9 is a chart showing the relation of the maximum tilt of the sides and tops of the prism to the index of refraction.

FIGURE 10 is a chart showing the relation of the minimum shielding angle to the index of refraction.

Figure 3A:
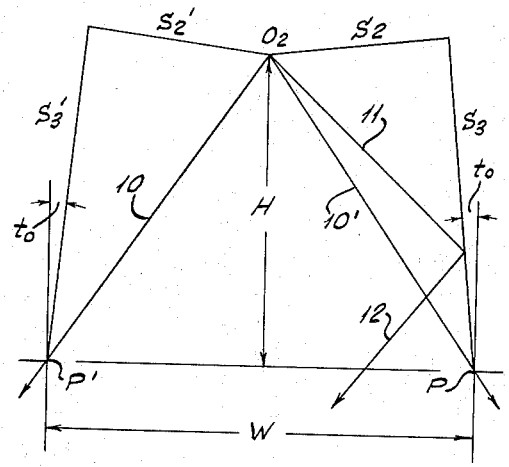
FIGURE 3a shows the basic shielding prism.

FIGURES 1a, 1b, 1c and 1d show a lens plate with such configurations on both the outer and inner surfaces as to provide both lateral and longitudinal control of the light from the source. Lateral control is provided by conventional prisms parallel with the source on the outer surface of the plate. Longitudinal control is provided by special prismatic configurations perpendicular to the source on the inner surface of the plate. Being mutually perpendicular, the prisms on the outer surface do not materially affect the action of the prisms on the inner surface, nor do the prisms on the inner surface materially affect the action of the prisms on the outer surface. The prismatic configurations on the inner surface of the plate consist of symmetrical quadrilateral ridges separated by spaces. The inner bounding surfaces are designated $S_2$, $S_3$, and $S_4$ as shown in FIGURES 1a, 1b, 1c, and 1d and the outer surface of the plate, $S_1$.

FIGURE 2 shows the light control available at the lower surface, $S_1$. For convenience of discussion lower surface $S_1$ of the plate will be assumed to be horizontal and the plane of the paper to be the longitudinal plane in which the light rays lie; also that all angles are measured from nadir. Light rays in the medium falling on point $O_1$ at an angle of incidence from the normal $NS_1$ greater than C, are totally reflected and not emitted through $S_1$. Any light which is or can be brought into these regions may, therefore, be neglected so far as direct transmission is concerned. Light nearer $NS_1$ than C is refractively transmissible through 180°. If no light is to be obtained at angles greater than A from $NS_1$, the internal light must be confined to the angle B which is less than angle C. The angle B is determined by the formula $\sin A + n \sin B$, wherein $n$ stands for the index of refraction. It, therefore, follows that at point $O_1$ no light should be received from either side of $NS_1$ between angle B and angle C.

FIGURE 3 shows a surface $S_2$ tilted at an angle $t_0$ in reference to the plate. If it receives light from all directions this light will be concentrated, on entering the glass, into a cone bounded in the plane of the paper by rays 10 and 11. These rays will be separated from the normal to the surface, $NS_2$, by the critical angle, C; but since surface $S_2$ is tilted by angle $t_0$, ray 10 will be separated from the normal to the plate, $NS_1$, by the angle $(C-t_0)$ and ray 11 will be separated from $NS_1$ by the angle $(C+t_0)$. It follows that if the tilt of the surface is such that angle $(C-t_0)$ equals angle B, shown in FIGURE 2, all light on the left hand side of $NS_1$, as shown in FIGURE 3, on being transmitted into air through lower surface $S_1$ will be confined to the zone limited by angle A of FIGURE 2.

If the sector of light on the right hand side of $NS_1$, FIGURE 3, bounded by ray 11 with a slope of $(C+t_0)$, is permitted to reach surface $S_1$, light will be transmitted through $S_1$ into air at angles up to 90°. It is possible however to interpose a surface, $S_3$, in the path of ray 11 and adjacent rays so that these rays are reflected at steeper angles. Ray 12, the reflection of ray 11, is the bounding ray of such reflected rays. If ray 12 is made parallel with ray 10, all light entering through surface $S_2$ will meet the lower surface at angles not greater than B, FIGURE 2.

In reference to $NS_1$, FIGURE 3, bounding ray 11 has a slope $C+t_0$, bounding ray 12, if parallel to ray 10, a slope $C-t_0$. Since these rays make opposite angles with $NS_1$, the angle between ray 11 and ray 12 projected, angle D, equals $(C+t_0)+(C-t_0)=2C$. The desired surface $S_3$ must bisect angle D, consequently the angle separating it from ray 11 must be equal to C. Since the slope of ray 11 is $C+t_0$, the slope of surface $S_3$ is $C+t_0-C=t_0$. Surface $S_3$ therefore is perpendicular to surface $S_2$.

FIGURE 3a shows a diagram of a complete shielding prism. It is laterally symmetric, each side being similar to the diagram shown in FIGURE 3.

If side $S_3$ is to fulfill its function of reflecting all rays entering through surface $S_2$ at angles greater than $C-t_0$, it must extend to point P where it intersects ray 10' which enters at point $O_2$ with slope $C-t_0$. Likewise $S'_3$ must extend to P' where it intersects ray 10. Thus the height-width ratio of the basic prism is established:

$$\frac{H}{W} = \tfrac{1}{2} \operatorname{ctn}(C-t_0)$$

From the foregoing it is apparent that the shielding angle of a screening prism depends on the slope of the sides and tops, $t_0$; the greater the angle $t_0$, the lower the shielding angle. There are, however, factors which limit angle $t_0$. All such factors are dependent on the critical angle and therefore on the index of refraction of the substance of which the plate is made. To facilitate the explanation of the limitations of angle $t_0$, it will be assumed that the plate is made of various materials having various indices of refraction commencing with the lowest index for which a shielding prism can be made and proceeding to higher indices. FIGURE 9 is a chart showing the limiting values of $t_0$ in terms of the index of refraction up to an index of refraction of 2.0. These limits are maximum values; it is always possible to use smaller values for $t_0$ than shown in this chart. Explanations of the factors controlling these limiting values of $t_0$ follows.

Figure 4:
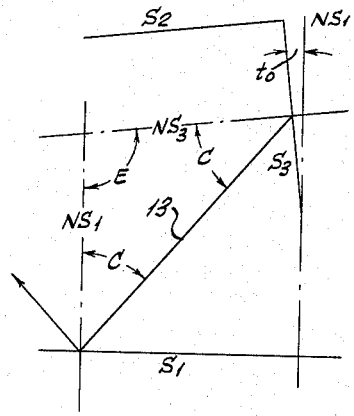
FIGURE 4 is a diagram illustrating the limit of the slope of the side imposed by light entering through the side and striking the lower surface of the plate.

No matter what the index of refraction, to prevent emission of light above the desired shielding angle (see FIGURE 2) the slope of side $S_3$ must be such that all rays which can enter through this surface and strike the lower surface, $S_1$, meet $S_1$ at angle of incidence equal to or greater than the critical angle, in order that they may be internally reflected by $S_1$. Grazing light entering surface $S_3$, FIGURE 4, is transmitted into the medium at the critical angle C from normal $NS_3$ as shown by ray 13. This is the steepest ray which can enter through surface $S_3$. It must be separated from normal $NS_1$ to surface $S_1$ by an angle equal to or greater than the critical angle C. In the limiting case angle E between $NS_1$ and $NS_3$ is the third angle of an isoceles triangle, the other two angles being equal to C; therefore angle $E=180°-2C$ and slope, $t_0$, of side $S_3$ is given by the formula:

$$t_0 = 90 - 2C \qquad (1)$$

If $t_0$ is greater than $90°-2C$, light entering through side $S_3$ will be transmitted through lower surface $S_1$ of the plate and will emerge at very high angles. If $t_0$ is less than $90°-2C$, light transmitted through surface $S_3$ will strike lower surface $S_1$ of the plate at greater angles than the critical angle and will be internally reflected. This is the only limitation of the magnitude of angle $t_0$ which need be considered when the index of refraction is less than 1.48.

Figure 5:
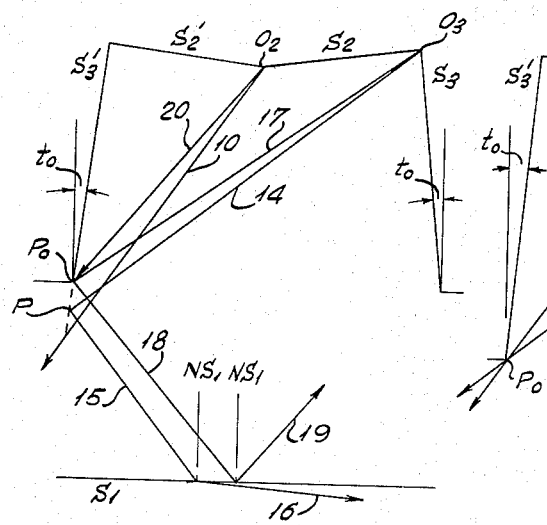
FIGURE 5 is a diagram illustrating the limit of the slope of the side imposed by light entering through the side and striking the opposite side of the prism.

At higher indices of refraction than 1.48 light entering a shielding prism through the side $S_3$, instead of going directly to the outside surface of the plate $S_1$ may be intercepted by the opposite side of the prism, $S'_3$. It is either transmitted through this surface into air above the plate or it is reflected. As shown in FIGURE 5 by rays 14, 15, and 16, such reflected rays may be transmitted by surface $S_1$ and produce emission at high angles.

This may be prevented by terminating sides $S_3$ and $S'_3$ at point $P_0$, the point below which this unwanted effect occurs. The position of point $P_0$ is determined by the slope of ray 17 entering side $S_3$ at upper corner $O_3$ of the prism. In order that unwanted transmission through lower surface $S_1$ may not take place the slope of ray 17 must not be less than $C+2t_0$.

As shown in FIGURE 3, ray 10 establishes the shielding angle of the prism. If point $P_0$ is above the intersection of ray 10 with side $S'_3$ projected, some light will be emitted above the shielding angle. The limit of such emission is established by the slope of ray 20, drawn from center point $O_2$ of the upper surface of the prism through point $P_0$.

Figure 6:
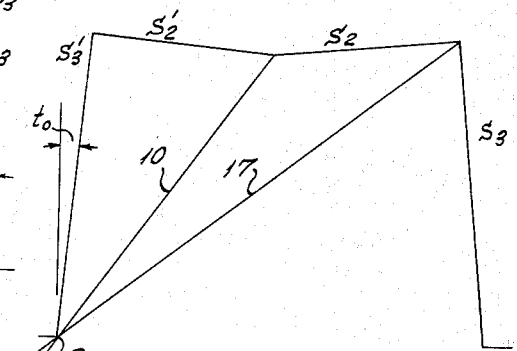
FIGURE 6 shows a method of overcoming the above limitation by reducing the tilt of the sides and top of the prism.

Instead of limiting the height of the shielding prism as suggested above and therefore permitting light to escape into air above the shielding angle, it is possible to select such a value of angle $t_0$ that ray 10 and ray 17 intersect at point $P_0$ as shown in FIGURE 6. The value of the slope $t_0$ to satisfy this condition may be calculated by the formula:

$$\tan t_0 = \tan(C+2t_0) - 2\tan(C-2t_0)$$

The maximum values of $t_0$ to satisfy this condition are shown in FIGURE 9 by the lower branch of the curve, from an index of refraction of 1.48 to 1.66.

Above an index of refraction of 1.66 another factor determines the maximum value of $t_0$. The steepest ray which can enter through side $S_3$ or $S'_3$, slopes at $90°-C-t_0$. If reflected by the opposite side, the slope of the reflected ray becomes $90°-C-3t_0$. If this slope is equal to, or greater than C, no light will be transmitted through $S_1$. According to this, the formula for the maximum value of $t_0$ becomes:

$$t_0 = \tfrac{1}{3}(90 - 2C)$$

Values of $t_0$, shown by the lower branch of the curve in FIGURE 9 above an index of refraction of 1.66, were calculated by means of this formula.

Determinations of the maximum value of $t_0$ for various indices of refraction heretofore described have assumed a straight sided prism. If the lower part of the side of the prism is curved in such a manner as will be described, a greater value of $t_0$ may be used. The limiting value of $t_0$ for curved sided prisms is shown by the upper branch of the curve, FIGURE 9.

Figure 7:
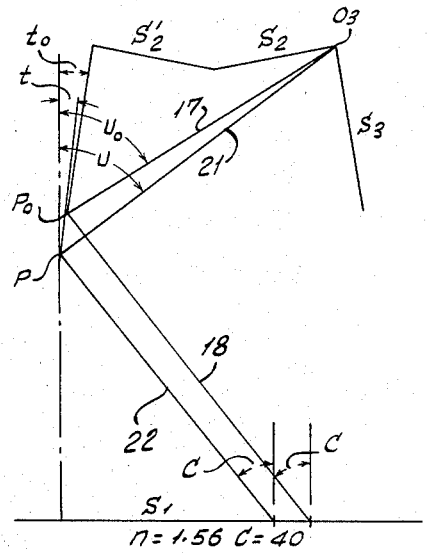
FIGURE 7 shows another method of overcoming the above limitation by changing the slope of the lower portion of the sides of the prism.

If P, FIGURE 7, designates any point on surface $S'_3$ below $P_0$, the slope of surface $S'_3$ at P must be such that ray 21 from upper corner $O_3$ of the prism to point P is either transmitted or so reflected that it is again reflected by lower surface $S_1$.

Let U represent the slope of ray 21, the ray from point $O_3$ to point P, then $t$, the maximum slope of side $S'_3$ at P for reflection and re-reflection of ray 21 by lower surface $S_1$, is given by equation:

$$t = \tfrac{1}{2}(U - C)$$

Figure 8:
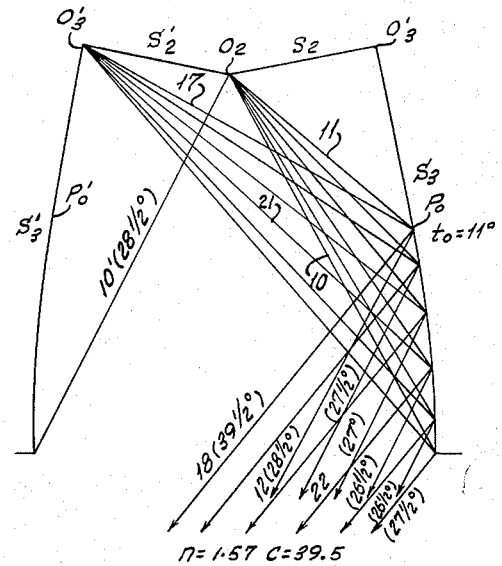
FIGURE 8 shows a curved sided prism designed to limiting values.

It is possible to generate a parabola satisfying this condition from $P_0$ to point $P_1$ where it intersects ray 10. Such construction is shown in FIGURE 8. FIGURE 8 shows that no rays entering side $S'_3$ are reflected at such angles that they are transmitted through the lower surface of the plate, $S_1$; and that all rays entering through top $S_2$ are reflected by side $S_3$ at angles equal to or less than the shielding angle—the slope of ray 10.

As the index of refraction increases, point $P_0$ moves upward on side $S_3$ toward corner $O_3$. When the index of refraction is 1.57, ray 11, the bounding ray from $O_2$ of the sector of light admitted through surface $S_2$ (as shown in FIGURE 3), meets surface $S_3$ at $P_0$. For indices of refraction greater than 1.57 this ray would be reflected by the element of surface $S_3$ below $P_0$ with a slope $t$ which is steeper than $t_0$. For this reason it would be reflected at a greater angle than ray 10 and cause light to be emitted above the shielding angle.

This can be prevented by making $t_0$ such that ray 11, whose slope is $C+t_0$, meets side $S_3$ at $P_0$. The value of $t_0$ to fulfill this condition is given by the equation $$\tan t_0 = \tan(C + 2t_0) - 2\tan C$$

The upper branch of the curve shown on FIGURE 9 beyond $n=1.57$ is calculated according to this equation.

From these data minimum shielding angles corresponding to the maximum values of $t_0$ for various indices of refraction can be calculated. A curve of such shielding angles in terms of the index of refraction is shown in FIGURE 10. By choosing a lesser value of $t_0$ than shown in FIGURE 9, however, any shielding angle greater than the minimum shown in FIGURE 10 can be obtained.

Figure 11:
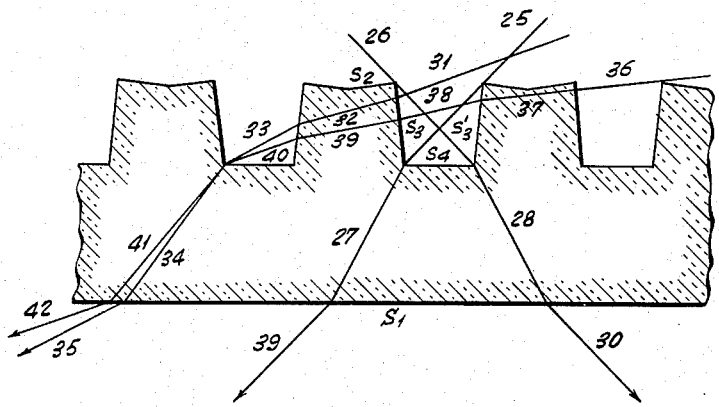
FIGURE 11 illustrates the effect of spaces between shielding prisms.

If shielding prisms were located contiguously on the inner surface of a plate with no intervening space between them, the longitudinal shielding effect of the plate would be the same as that of any individual prism. Manufacturing conditions, however, generally require that the prisms be placed some distance apart, as illustrated in FIGURE 11, which shows a screening prism plate designed for an index of refraction of 1.50.

The space between the prisms, $S_4$, receives some light directly from the source. This sector of entering light is bounded by rays 25 and 26 which, passing through the plate—rays 27 and 28—emerge as rays 29 and 30, parallel to rays 25 and 26. In general the width of the space between prisms should be so limited that the slopes of rays 25 and 26 do not exceed the shielding angle of the prism.

In addition to the light described above, some light transmitted through one or more shielding prisms impinges on $S_4$, is transmitted through it into the plate, and emerges into air below the plate.

Various quantities of such light emerge at various angles. Due to multiple refraction, however, the quantity of such light is small. For instance, ray 31–32–33–34–35, which emerges approximately at the shielding angle of the prisms has a transmission factor of 76%, and ray 36–37–38–39–40–41–42, emerging 10° higher has a transmission factor of only 58%.

Because of the divergent slopes of the sides of the shielding prisms through which these rays travel, they are depressed. Ray 31 enters with a slope of 70°, but is emitted into air (ray 35) at 61°. Ray 36 entering at 83.6°, emerges (ray 42) at 70°. This depressing effect limits the highest ray that can be emitted, for example, for an index of refraction of 1.50 and the spacing shown, the highest ray leaving the plate is emitted at 70.3°.

I have described what I believe to be the best embodiments of my invention. I do not wish, however, to be confined to the embodiments shown, but what I desire to cover by Letters Patent is set forth in the appended claims.

I claim:

1. A luminaire comprising an extended tubular lamp and a substantially planar refracting plate, disposed in the path of direct light from said lamp, said plate having on the light-incident surface a plurality of prisms arranged in laterally spaced and parallel relationship, and extending transversely of said lamp and toward the same for controlling the divergence of light longitudinally thereof, the outer configuration of each of said prisms in transverse cross-section being quadrilateral above a base plane thereof and including two opposing sides converging upwardly from the base plane and terminating at the edges of a truncated top, said opposing sides being symmetrically disposed on either side of a plane extending perpendicularly to the base plane, said truncated top of each of said prisms including a pair of downwardly converging top surfaces extending in converging paths from the upper edges of said opposing sides, and the slope angle of said opposing sides measured with respect to the vertical is equal to the slope angle of said downwardly converging top surfaces measured with respect to the horizontal.

2. A luminaire as in claim 1, wherein the maximum limit for a slope angle for material having an index of refraction within ranges 1.41 to 1.48 is derived from the formula $$t_0 = 90° - 2C$$

wherein $t_0$ is equal to the maximum limit and $C$ is equal to the critical angle.

3. A luminaire as in claim 1, wherein the maximum limit for a slope angle for material having an index of refraction within ranges 1.48 to 1.66 is derived from the formula $$\tan t_0 = 2 \tan (C+2t_0) - 2 \tan (C-2t_0)$$

wherein $t_0$ is equal to the maximum limit and $C$ is equal to the critical angle.

4. A luminaire as in claim 1, wherein the maximum limit for a slope angle for material having an index of refraction within ranges 1.66 to greater than 2 is derived from the formula $$t_0 = \tfrac{1}{3}(90 - 2C)$$

wherein $t_0$ is equal to the maximum limit and $C$ is equal to the critical angle.

References Cited in the file of this patent

UNITED STATES PATENTS

| Number | Name | Date |
|---|---|---|
| 637,145 | Moffat et al. | Nov. 14, 1899 |
| 821,307 | Mygatt | May 22, 1906 |
| 1,682,490 | Dressler | Aug. 28, 1928 |
| 2,269,554 | Rolph | Jan. 13, 1942 |
| 2,398,507 | Rolph | Apr. 16, 1946 |
| 2,551,954 | Lehman | May 8, 1951 |
| 2,623,160 | McPhail | Dec. 23, 1952 |
| 2,737,577 | McPhail | Mar. 6, 1956 |
| 2,773,172 | Pennow | Dec. 4, 1956 |
| 2,833,916 | Foulds | May 6, 1958 |